US012697867B2

(12) United States Patent
Fox-Rabinovitz

(10) Patent No.: US 12,697,867 B2
(45) Date of Patent: Aug. 4, 2026

(54) LIQUID RESERVOIR LEAK DETECTION SYSTEM

(71) Applicant: Torc Robotics, Inc., Blacksburg, VA (US)

(72) Inventor: Joseph R. Fox-Rabinovitz, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 301 days.

(21) Appl. No.: 18/412,027

(22) Filed: Jan. 12, 2024

(65) Prior Publication Data

US 2025/0229625 A1 Jul. 17, 2025

(51) Int. Cl.
B60K 15/03 (2006.01)
G01M 3/00 (2006.01)

(52) U.S. Cl.
CPC ............. B60K 15/03 (2013.01); G01M 3/007 (2013.01); B60K 2015/03223 (2013.01)

(58) Field of Classification Search
None
See application file for complete search history.

(56) References Cited

U.S. PATENT DOCUMENTS

| | | | |
|---|---|---|---|
| 9,857,266 B2 | 1/2018 | Tseng et al. | |
| 11,499,494 B1 | 11/2022 | Lee et al. | |
| 2003/0019286 A1 | 1/2003 | Wakahara et al. | |
| 2006/0114113 A1* | 6/2006 | Yokosawa | G01N 33/0063 340/632 |
| 2008/0236914 A1* | 10/2008 | Horii | B62K 11/00 180/220 |
| 2016/0236536 A1* | 8/2016 | Hirakata | B60L 58/30 |
| 2023/0206703 A1* | 6/2023 | Maitre | B60L 3/0053 701/31.4 |

* cited by examiner

*Primary Examiner* — Mark A Shabman
(74) *Attorney, Agent, or Firm* — Armstrong Teasdale LLP

(57) ABSTRACT

In one aspect, a vehicle and associated method includes a liquid reservoir, a first sensor mounted in front of the liquid reservoir, a second sensor mounted behind the liquid reservoir, a memory storing instructions, at least one processor configured to access the memory and receive a plurality of inputs from the first and second sensors, the at least one processor being configured to compare a first sensor output from the first sensor to a second sensor output from the second sensor, and based on a determined difference between the first and second sensor outputs, initiate a notification of a detected leak in the liquid reservoir.

20 Claims, 5 Drawing Sheets

LIQUID RESERVOIR LEAK DETECTION SYSTEM

TECHNICAL FIELD

The field of the disclosure relates generally to vehicle control systems, and more specifically, to the detection of fluid leaks.

BACKGROUND

The use of autonomous vehicles has become increasingly prevalent in recent years as their numerous potential benefits are realized. Despite their advantages, autonomous vehicles still face many of the road hazards faced by human piloted vehicles. For example, road debris or corrosion may interfere with a vehicle. Such conditions may cause perforations in fuel tanks, oil pans, coolant systems, and the like. Human operators may sometimes detect such leaks according to a sound, smell, visible spray, or other indication of the vehicle condition. However, sensors that are present in current autonomous systems, such as forward or rear facing cameras, time of fight sensor, and the like, may not be positioned, specified, or otherwise configured to detect such conditions.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, a vehicle includes a liquid reservoir, a first sensor mounted in front of the liquid reservoir, a second sensor mounted behind the liquid reservoir, a memory storing instructions, at least one processor configured to access the memory and receive a plurality of inputs from the first and second sensors, the at least one processor being configured to compare a first sensor output from the first sensor to a second sensor output from the second sensor, and based on a determined difference between the first and second sensor outputs, initiate a notification of a detected leak in the liquid reservoir.

According to another particular implementation, a method of detecting a leak in liquid reservoir of a moving vehicle may include receiving a first sensor output from a first sensor positioned in front of a liquid reservoir, receiving a second sensor output from a second sensor positioned behind the liquid reservoir, comparing the first sensor output to the second sensor output, and based on a determined difference between the first and second sensor outputs, initiating a notification of a detected leak in the liquid reservoir According to another aspect, at least one computer-readable storage medium with instructions stored thereon may, in response to execution by at least one processor, cause the at least one processor to receive a first sensor output from a first sensor positioned in front of a liquid reservoir, receive a second sensor output from a second sensor positioned behind the liquid reservoir, compare the first sensor output to the second sensor output, and based on a determined difference between the first and second sensor outputs, initiate a notification of a detected leak in the liquid reservoir Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
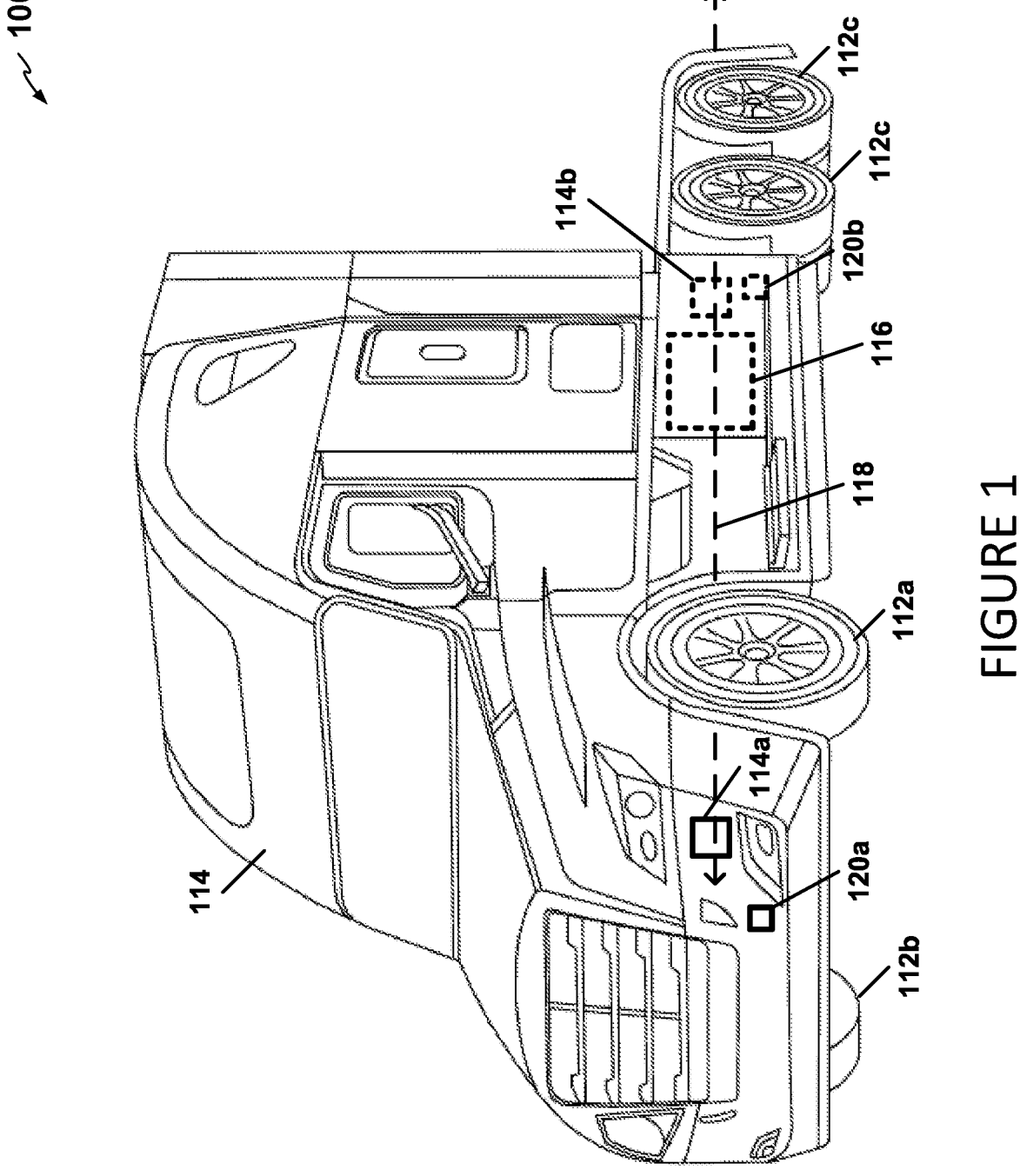
FIG. 1 illustrates a vehicle that may include a truck that may further be conventionally connected to a single or tandem trailer to transport the trailers (not shown) to a desired location.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

An implementation includes a detection system for leaking liquid tanks or other liquid reservoirs on a moving vehicle. To this end, an embodiment of the system may include paired, corresponding sensors mounted in front of and behind each liquid tank on a vehicle. When traveling at speed, air pressure forces fluid droplets backwards, creating a stream or spray that will generally be observable behind the tank fluid. The data and information collected from the corresponding sensors may be compared and any difference may be analyzed for indications of leaking fluid. In one example, comparing images and other sensor data may function to cancel out the detected effects of rain and spray from the road. The cancellation may allow the processors to determine that moisture detected at the rear sensor originated at a perforation of the tank. While particularly useful for autonomous trucks, the features described herein may apply to ground-based liquid-fueled vehicles, including non-autonomous and semi-autonomous vehicles.

According to a particular embodiment, a first moisture sensor may be positioned forward of the liquid tank on a tractor trailer. A second moisture sensor may be positioned substantially in-line (e.g., along the direction of the length of the truck) behind the fuel tank towards the rear of the vehicle. Another or the same configuration may include a similarly positioned pair of temperature sensors. That is, one temperature sensor may be mounted in front of the liquid tank, while the other temperature sensor is mounted on the opposite side of the tank towards the rear of the vehicle. While not intended as an exhaustive list, other "paired," or "grouped" sensors (e.g., in a case where more than two corresponding sensors are used) may include infrared (IR), camera, ultrasound, radio detection and ranging (RADAR), chemical and vibration sensors.

Where the sensors include cameras, a photographic image collected by a camera mounted forward of the reservoir may be compared to a photographic images recorded at a camera positioned towards the rear of the reservoir. As described herein, a first image may be buffered so that a second photographic image is taken at the same point along the roadway. Image analysis algorithms may be executed by the processor to identify differences (e.g., mist, blurring of the second image, etc.) and determine if they are attributable to a reservoir leak.

Where sensors include a moisture sensor, heavier moisture detected at the rear sensor may be an indicator that fuel is spraying out into the air from the tank. Likewise, a cooler temperature detected by a temperature senor mounted behind the reservoir than that which was detected ahead of the tank may be an indicator of a potential leak. Relatedly, different temperatures of fluids may be detected and used to distinguish water from fuel and other fluids. Likewise, a higher concentration of a chemical such as gasoline by a chemical sensor mounted behind the reservoir than which is detected ahead of the tank may be an indicator of a potential leak.

IR sensors may passively collect data at both sides of a tank, while radar may actively send and RADAR may actively send a signal to a target (e.g., road, air around the tank, etc.) and receive a reflection from the target for analysis. Where ultrasound sensors are additionally or alternatively employed, reflective properties of various materials may be used to determine moisture content. The reflective properties may change based on material properties such as density and viscosity. Thus, differences in the reflective properties of the materials sensed may provide an additional manner of distinguishing different fluids. For instance, water may be distinguished from gasoline traveling through the air behind the liquid tank because water has different reflective properties than aerosol. While particularly useful for autonomous trucks, the features described herein may apply to ground-based liquid-fueled vehicles, including crewed and semi-autonomous vehicles.

In preparation of the comparison, the outputs from corresponding sensors may be calibrated and otherwise undergo signal processing according to their different placements, orientations, and environmental exposures. For instance, the system may buffer the signal from the front sensor by an amount of time sufficient to offset the velocity of the vehicle. In this manner, the difference between the compared sensor signals corresponds to observations over the same location over the road. Thus, the buffer may be proportional to the speed, so as to be longer at slower speeds, and shorter at high speeds, and in this way, the sensors are enabled to analyze the same location over the road. For example, if it takes half of a second at a first speed for the vehicle to traverse a length of road that is the equivalent of the distance separating two sensors, the signal from the front sensor may be buffered the half of a second, until the second sensor detects the specific location previously measured by the first sensor, and so that the compared sensor measurements were detected at the same physical location along the surface (e.g., road) traveled by the vehicle. Other calibration may account for different heights and alignment of sensors, as described in greater detail herein.

Calibration information may be incorporated into the signals from the two sensors. Under normal circumstances, comparable measurements may be expected to be made by both sensors. When a fuel leak arises, the rear sensor may detect spray in the air and possibly some moisture on the ground (e.g., at lower speeds). Aerosol particles forced out of a narrow opening in the fuel tank may further reduce the air temperature or chemical content measured by the rearward sensor. When changes in the signal differences are detected for a prolonged period of time, a notification is triggered to indicate that a potential liquid leak is present.

The calibration processes may map moisture and temperature readouts of air and surfaces (as sensed by the different sensors) to a common computational scale. This common scale may make the sensor outputs effectively comparable to one another. Calibration may be performed to account for differences in the sensors themselves. In one example, the scale may include a quantified mathematical scaling using a relative placement of first and second sensor mounts, an orientation of at least one of the first and second sensors, an environmental exposure, an environmental condition, and a computational model. Calibration may additionally account for defects and differences that result from manufacturing, materials, and different sensor designs. Calibration processes may additionally account for different sensor placement on the vehicle. Factors such as shade, wind speed, and precipitation may expose sensors to different conditions. For instance, the front sensor may detect greater wind speeds and precipitation amounts.

Other calibration processes may address different distances from the ground as well as any different orientation angles of the rear and forward sensors. A tilt or other orientation angle of each mounted sensor may additionally be calibrated. For example, forward sensors are likely to be angled or otherwise oriented in order to scan the road ahead, while rear sensors may not be tilted, or could be tilted in a different direction than the front positioned sensors. An ultrasound sensor positioned in the front of the liquid tank may detect different Doppler velocities than an ultrasound sensor in the rear as a consequence of the different orientations of the sensors.

The calibration operations may include scaling processes, such as bias, multiplication, and non-linear functions applied to one or more of the corresponding signals. The system may additionally include estimating an uncertainty factor based on external knowledge and statistics of the signals themselves. In one example, processors may mathematically apply an uncertainty score to determine whether a detected difference in sensor measurements is significant. For example, when it is raining, calibration may not only account for the fact that the rear sensor in the illustrative layout is going to be slightly less exposed to the falling rain, but also that the moisture readings of the rear sensor are going to be less precise in general. In another example, when the vehicle performs a turning maneuver the length of ground that the front and rear sensors sense may not be the same. The uncertainty factor of a detected difference in this case may therefore be proportional to a sideslip between the different paths of surface that the sensors measure. In a sense, the uncertainly factor may be used to raise or lower a threshold level of confidence that a leak is actually present.

Empirical data from testing grounds (e.g., a closed-course track) and actual trip recordings may be used to set the uncertainty factor, as well as weighted coefficients for various sensors and conditions so that the outputs match when expected. Illustrative examples of such conditions may include windspeed, different moisture characteristics of different liquids, precipitation, and turn angles, among many other factors. Machine learning may be employed to train models based on the empirical data, although classical algorithms may be used as well. For instance, the model may access and identify different images and other sensor measurements and then match the measurements to known conditions and assessments. For example, a detected pattern of streaks forming on a camera lens may be determined through modelling to be of a type manifested by a liquid leak, rather than precipitation. In another example, a detected cooler temperature to the rear of the reservoir, combined with a recognized light variation, may be determined to be the result of an environmental condition, rather than a leak.

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, or steering, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA. The semi-autonomous vehicle requires a human driver at all times for operating the semi-autonomous vehicle.

A non-autonomous vehicle: A non-autonomous vehicle is a vehicle that is driven by a human driver. A non-autonomous vehicle is neither an autonomous vehicle nor a semi-autonomous vehicle. A non-autonomous vehicle has an autonomy level of level-0 recognized by NHTSA.

FIG. 1 illustrates a vehicle 100 that may include a truck that may further be conventionally connected to a single or tandem trailer to transport the trailers (not shown) to a desired location. The vehicle 100 includes a cab 114 that can be supported by, and steered in, the required direction by front wheels 112a, 112b, and rear wheels 112c that are partially shown in FIG. 1. Wheels 112a, 112b are positioned by a steering system that includes a steering wheel and a steering column (not shown in FIG. 1). The steering wheel and the steering column may be located in the interior of cab 114. The steering wheel and the steering column, and all or parts of cab 114 may be omitted in an autonomous vehicle.

According to a particular embodiment, a first sensor 114a, such as a moisture sensor, may be positioned in front of a gas tank 116. The gas tank 116 is depicted with dashed lines to denote that it may be positioned towards the interior of the vehicle 100 (e.g., inside of an airfoil, but outside of the cab). The second sensor 114b may be of the same type as the first sensor (e.g., a moisture sensor) and may be positioned on the opposite side of the gas tank 116 towards the rear of the vehicle and along an axis 118 that runs parallel to the length of the truck 100. A second set of sensors 120a, 120b, which could be temperature sensors, among other types, may be similarly configured with respect to each other and the gas tank 116. The depiction of the sensors 114a, 114b, 120a, and 120b is merely for illustrative purposes and other embodiments may have fewer or more sensors in varying positions and orientations.

Figure 2:
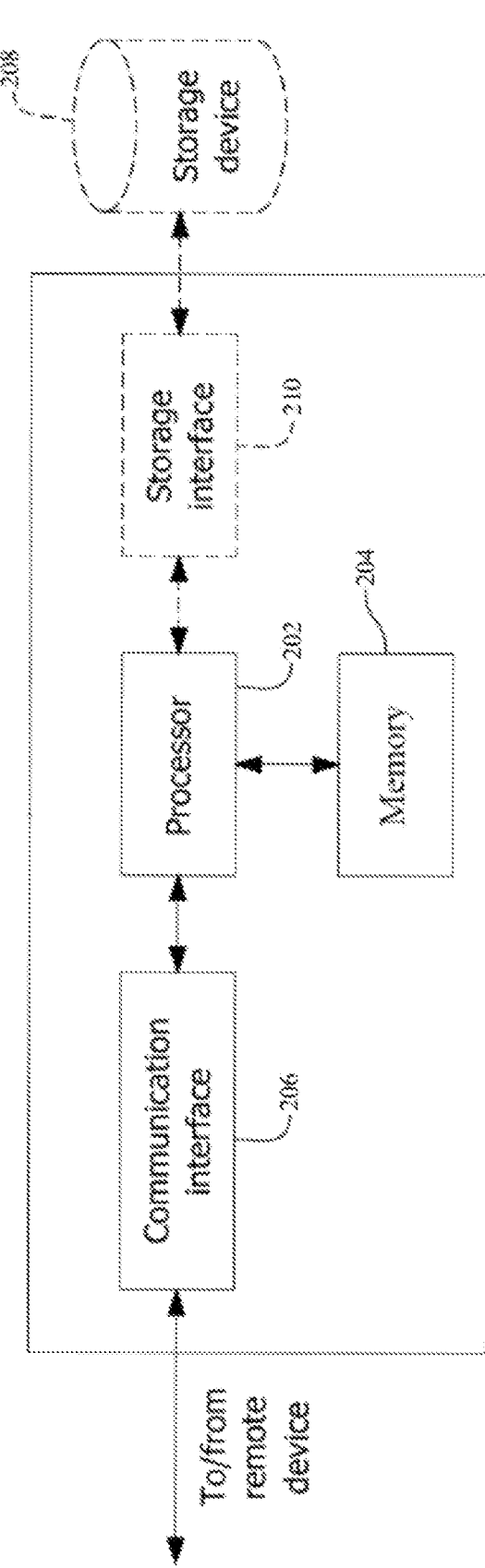
FIG. 2 is an exemplary schematic block diagram of a processing system for implementation of embodiments of the present disclosure.

FIG. 2 is an exemplary schematic block diagram of a processing system 200 for implementation of embodiments of the present disclosure. The processing system 200 may include the automated tire monitoring and defect detection system described herein. The processing system 200 may include one or more processing units or processors 202 (e.g., in a multi-core configuration). Processor 202 may be operatively coupled to a communication interface 206 such that the processing system 200 is capable of communicating with another device, such as a remote application server, a user equipment, a mobile device, a smart vehicle, a mission control or a central hub, or another processing system, for example, using wireless communication or data transmission over one or more radio links or digital communication channels using one or more of a Wi-Fi protocol, an RFID protocol, or a Near-Field Communication (NFC) protocol, as one-way communication or two-way communication.

Processor 202 may also be operatively coupled to a storage device 208. Storage device 208 may be any computer-operated hardware suitable for storing or retrieving data, such as, but not limited to, data associated with historic databases. In some embodiments, storage device 208 may be integrated in the processing system 200. For example, the processing system 200 may include one or more hard disk drives as storage device 208.

In other embodiments, storage device 208 may be external to the processing system 200 and may be accessed by a using a storage interface 210. For example, storage device 208 may include a storage area network (SAN), a network attached storage (NAS) system, or multiple storage units such as hard disks or solid-state disks in a redundant array of inexpensive disks (RAID) configuration.

In some embodiments, processor 202 may be operatively coupled to storage device 208 via the storage interface 210. Storage interface 210 may be any component capable of providing processor 202 with access to storage device 208. Storage interface 210 may include, for example, an Advanced Technology Attachment (ATA) adapter, a Serial ATA (SATA) adapter, a Small Computer System Interface (SCSI) adapter, a RAID controller, a SAN adapter, a network adapter, or any component providing processor 202 with access to storage device 208.

The processor 202 may execute computer-executable instructions for implementing aspects of the disclosure. In some embodiments, the processor 202 may be transformed into a special purpose microprocessor by executing computer-executable instructions or by otherwise being programmed. In some embodiments, and by way of a non-limiting example, the memory 204 may include instructions to perform specific operations, as described herein.

Figure 3:
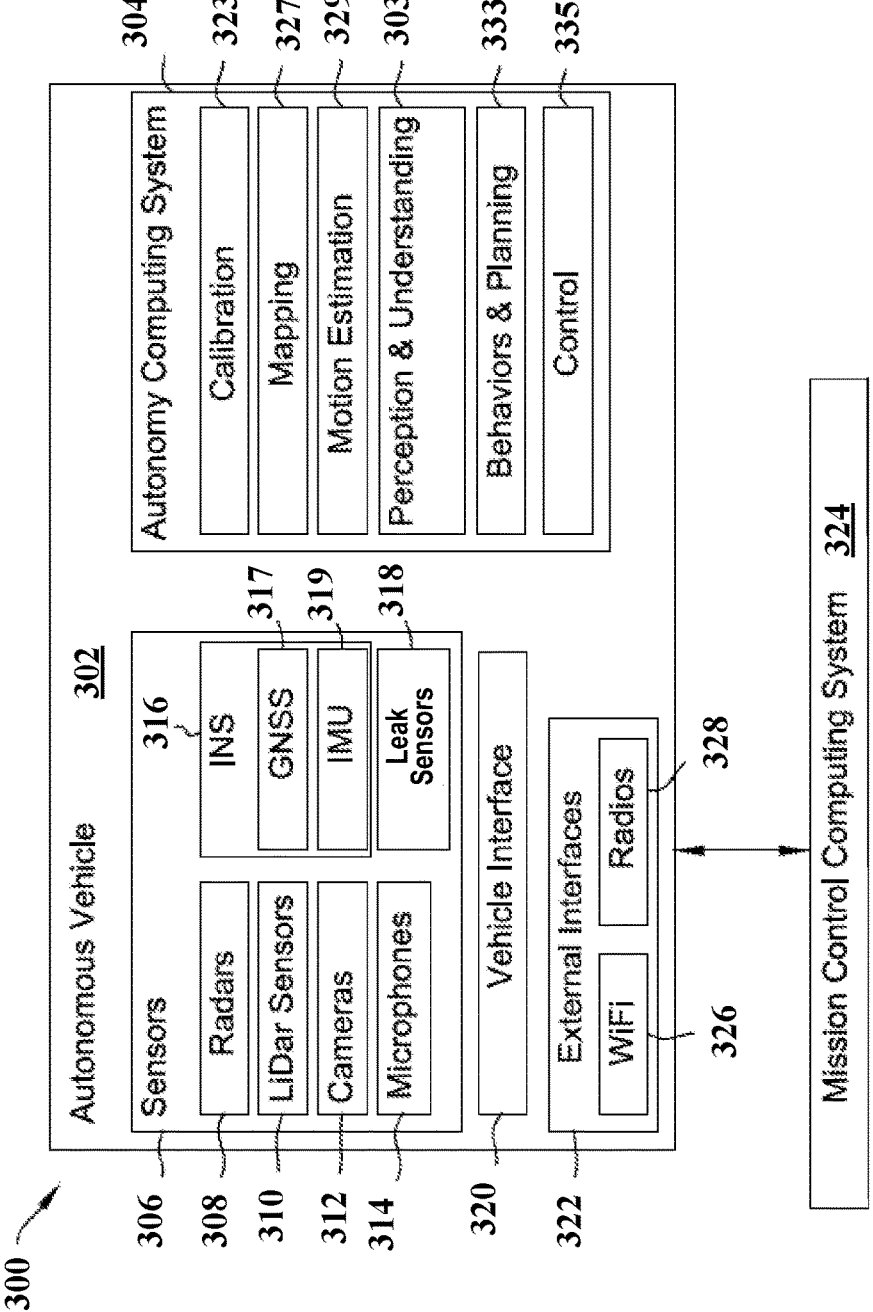
FIG. 3 is a block diagram of an autonomous driving system, including an autonomous vehicle that is communicatively coupled with a mission control computing system.

FIG. 3 is a block diagram of an autonomous driving system 300, including an autonomous vehicle 302 that is communicatively coupled with a mission control computing system 324. The vehicle 302 may be similar or the same as described with reference to any of the preceding figures.

In some embodiments, the mission control computing system 324 may transmit control commands or data to the autonomous vehicle 302, navigation commands, and travel trajectories to the autonomous vehicle 302, and may receive telematics data from the autonomous vehicle 302.

In some embodiments, the autonomous vehicle 302 may further include sensors 306. Sensors 306 may include RADAR devices 308, light detection and ranging (LiDAR) sensors 310, cameras 312, and acoustic sensors 314. The sensors 306 may further include an inertial navigation system (INS) 316 configured to determine states such as the location, orientation, and velocity of the autonomous vehicle 100. The INS 316 may include at least one global navigation satellite system (GNSS) receiver 317 configured to provide positioning, navigation, and timing using satellites. The INS 316 may also include at least one inertial measurement unit (IMU) 319 configured to measure motion properties such as the angular velocity, linear acceleration, or orientation of the autonomous vehicle 100. The sensors 306 may further include leak detection sensors 318 . . . . The meteorological sensors 318 are used to acquire meteorological data, such as the humidity, atmospheric pressure, wind, or precipitation, of the ambient environment of autonomous vehicle 302.

The autonomous vehicle 302 may further include a vehicle interface 320, which interfaces with an engine control unit (ECU) (not shown) or a MCU (not shown) of the autonomous vehicle 302 to control the operation of the autonomous vehicle 302 such as acceleration and steering.

The autonomous vehicle 302 may further include external interfaces 322 configured to communicate with external devices or systems such as another vehicle or mission control computing system 324. The external interfaces 322 may include Wi-Fi 326, other radios 328 such as Bluetooth, or other suitable wired or wireless transceivers such as cellular communication devices. Data detected by the sensors 306 may be transmitted to mission control computing system 324 via any of the external interfaces 322.

The autonomous vehicle 302 may further include an autonomy computing system 304. The autonomy computing system 304 may control driving of the autonomous vehicle 100 through the vehicle interface 320. The autonomy computing system 304 may operate the autonomous vehicle 302 to drive the autonomous vehicle from one location to another.

In some embodiments, the autonomy computing system 304 may include modules for performing various functions. Modules 323 may include a calibration module 323 a mapping module 327, a motion estimation module 329, perception and understanding module 303, behaviors and planning module 333, and a control module 335. Modules and submodules may be implemented in dedicated hardware such as, for example, an application specific integrated circuit (ASIC), field programmable gate array (FPGA), or microprocessor, or implemented as executable software modules, or firmware, written to memory and executed on one or more processors onboard the autonomous vehicle 302.

In some embodiments, based on the data collected from the sensors 306, the autonomy computing system 304 and, more specifically, perception and understanding module 303 senses the environment surrounding the autonomous vehicle 302 by gathering and interpreting sensor data. A perception and understanding module 303 interprets the sensed environment by identifying and classifying objects or groups of objects in the environment. For example, perception and understanding module 303 in combination with various sensors 306 (e.g., LiDAR, camera, radar, etc.) of the autonomous vehicle 100 may identify one or more objects (e.g., pedestrians, vehicles, debris, etc.) and features of a roadway (e.g., lane lines) around autonomous vehicle 302, and classify the objects in the road distinctly.

In some embodiments, a method of controlling an autonomous vehicle, such as autonomous vehicle 302, includes collecting perception data representing a perceived environment of autonomous vehicle 302 using the perception and understanding module 303, comparing the perception data collected with digital map data, and modifying operation of the vehicle 302 based on an amount of difference between the perception data and the digital map data. Perception data may include sensor data from sensors 306, such as cameras 312, LiDAR sensors 310, RADAR 308, or from other components such as motion estimation 329 and mapping 327.

The mapping module 327 receives perception data or raw sensor data that can be compared to one or more digital maps stored in mapping module 327 to determine where the autonomous vehicle 302 is in the world or where autonomous vehicle 302 is on the digital map(s). In particular, the mapping module 327 may receive perception data from perception and understanding module 303 or from the various sensors sensing the environment surrounding autonomous vehicle 302 and may correlate features of the sensed environment with details (e.g., digital representations of the features of the sensed environment) on the one or more digital maps. The digital map may have various levels of detail and can be, for example, a raster map, or a vector map. The digital maps may be stored locally on the autonomous vehicle 302 or stored and accessed remotely. In at least one embodiment, the autonomous vehicle 302 deploys with sufficient stored information in one or more digital map files to complete a mission without connection to an external network during the mission.

The behaviors and planning module 333 and the control module 335 plan and implement one or more behavior-based trajectories to operate the autonomous vehicle 302 similarly to a human driver-based operation. The behaviors and planning module 333 and control module 335 use inputs from the perception and understanding module 303 or mapping module 327 and motion estimation 329 to generate trajectories or other planned behaviors. For example, behavior and planning module 333 may generate potential trajectories or actions and select one or more of the trajectories to follow or enact by the controller 335 as the vehicle travels along the road. The trajectories may be generated based on proper (i.e., legal, customary, and safe) interaction with other static and dynamic objects in the environment. Behaviors and planning module 333 may generate local objectives (e.g., following rules or restrictions) such as, for example, lane changes, stopping at stop signs, etc. Additionally, behavior and planning module 333 may be communicatively coupled to, include, or otherwise interact with motion planners, which may generate paths or actions to achieve local objectives. Local objectives may include, for example, reaching a goal location while avoiding obstacle collisions.

Based on the data collected from the sensors 306, the autonomy computing system 304 is configured to perform calibration, analysis, and planning, and control the operation and performance of autonomous vehicle 302. For example, the autonomy computing system 304 is configured to estimate the motion of autonomous vehicle 302, calibrate parameters of the sensors, such as the extrinsic rotations of cameras, LIDAR, RADAR, and IMU, as well as intrinsic parameters, such as lens distortions, in real-time, and provide a map of surroundings of autonomous vehicle 302 or the travel routes of autonomous vehicle 302. The autonomy computing system 304 is configured to analyze the behaviors of autonomous vehicle 302 and generate and adjust the trajectory plans for the autonomous vehicle 302 based on the behaviors computed by the behaviors and planning module 333.

Figure 4:
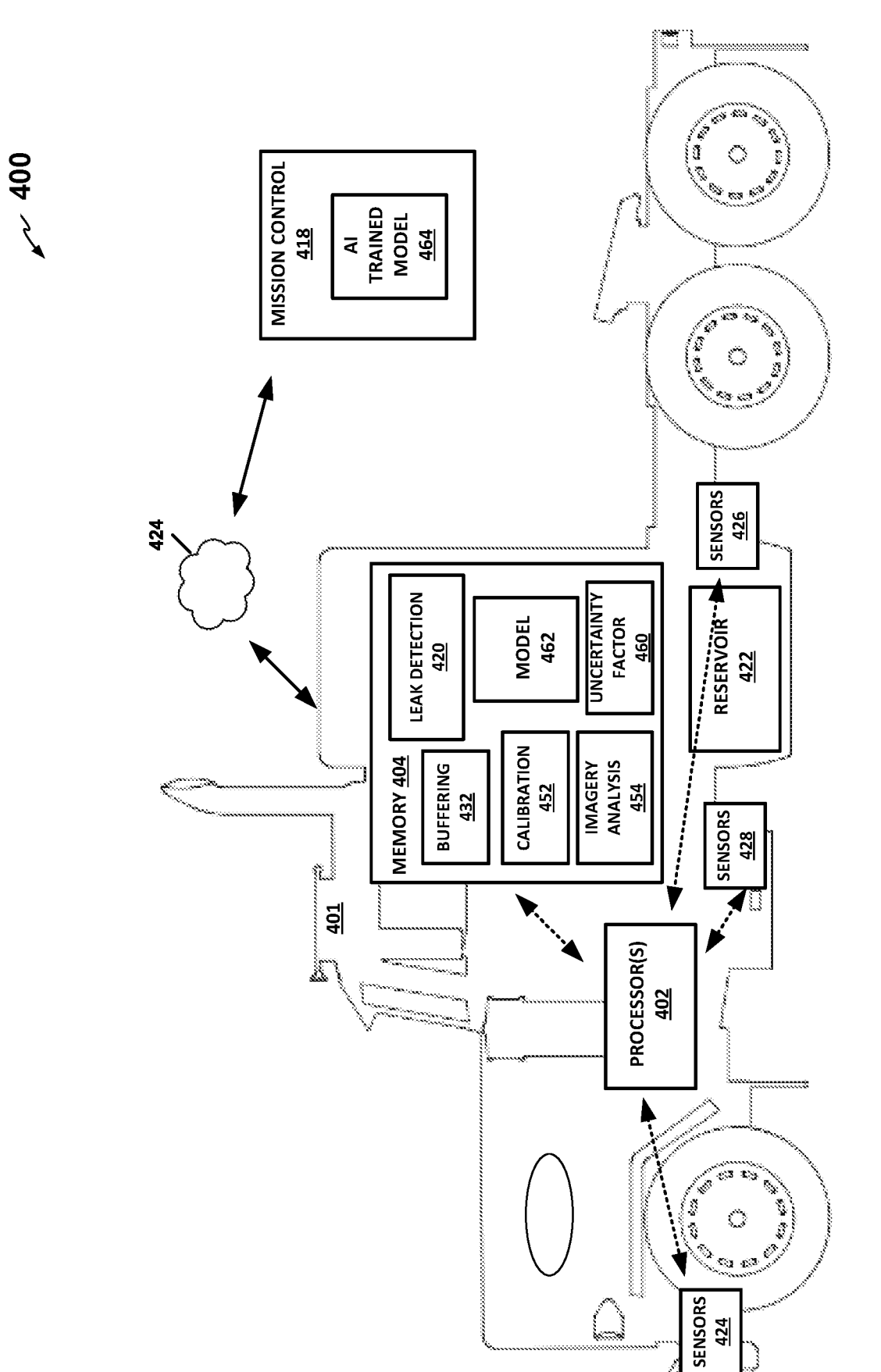
FIG. 4 is a block diagram showing illustrative components of leak detection system on a vehicle.

FIG. 4 is a block diagram showing illustrative components of a leak detection system 400 juxtaposed with an outline of a crewed, autonomous, or semi-autonomous vehicle 401. The relative positioning of the modules with respect to the outline are not intended to indicate a physical location, as the underlying hardware, software, and functionality of the modules may be dispersed throughout the vehicle and remotely throughout the system 400. For example, the system 400 includes one or more processors 402 in communication with a memory 404. While the processors 402 and memory 404 are depicted as being included within the autonomous truck, the processors and memory of another implementation, as well as their related functions may be distributed throughout one or more local and remote systems. For instance, a mission control center 418 may communicate instructions and data via a wireless connection 424. In another example, the one or more processors may include circuitry present in one or more of the modules illustrated in FIG. 4.

A memory 404 includes instructions (i.e., modules, or algorithms) executable by the processors 402 to operate the autonomous vehicle 401. For example, the memory 404 includes a leak detection algorithm 420 determining the presence of a leak in a liquid reservoir 422 on the moving vehicle 401. To this end, an embodiment of the system 400 may include paired, corresponding sensors 424, 426 mounted in front of and behind each liquid tank 422. The readings from the corresponding sensors 424, 426 may compared to one another and any difference may be analyzed for indications of leaking fluid. In one example, comparing images and other sensor data may function to cancel out the effects of rain and spray from the road. The cancellation may allow the processors 402 to determine that moisture detected at the rear sensor 426 originated at a perforation of the reservoir 422. An additional sensor 428 is shown to illustrate that more than two sensors may be grouped and used to provide sensor output for comparisons purposes.

Where the sensors 424, 426 include cameras, a photographic image snapped by a camera mounted forward of the reservoir 422 may be compared to a photographic images recorded at a camera positioned towards the rear of the reservoir 422. As described herein, a first image may be buffered using a buffering algorithm 430 so that a second photographic image is taken at the same point along the roadway. Image analysis algorithms may be executed by the processor to identify differences (e.g., mist, blurring of the second image, etc.) and determine if they are attributable to a reservoir leak.

Where sensors include a moisture sensor, heavier moisture detected at the rear sensor 426 may be an indicator that liquid is spraying out into the air from the tank 422. Likewise, a cooler temperature detected by a temperature senor 426 mounted behind the reservoir 422 (than that which was detected ahead of the reservoir 422) may be an indicator of a potential leak. Relatedly, different temperatures of fluids may be detected and used to distinguish water from fuel and other fluids. IR sensors may passively collect data at both ends of a tank, while RADAR may actively send and RADAR may actively send a signal to a target (e.g., road, air around the tank, etc.) and receive a reflection for analysis. Where ultrasound sensors are additionally or alternatively employed, reflective properties of various materials may be used to determine moisture content. The reflective properties may change based on properties like density and viscosity. Thus, differences in the reflective properties may provide an additional manner of distinguishing different fluids. For instance, water may be distinguished from gasoline traveling through the air behind the liquid tank because water has different reflective properties than aerosol. When sensors include a chemical sensor, a more concentrated presence of the chemicals in reservoir 422 detected at the rear sensor 426 may be an indicator that there is a leak in the reservoir 422.

In preparation of the comparison, the outputs from corresponding sensors 424, 426, 428 may be calibrated using a calibration algorithm 452 according to their different placements, orientations, and environmental exposures. For instance, calibration may account for different heights and alignment of sensors 424, 426, 428. Other calibration factors may include shade, wind speed, precipitation conditions, and speed and curvature of the vehicle's 401 path along the road. For instance, the front sensor 424 may naturally detect greater wind speeds and precipitation amounts than sensors 428 and 426. Calibration may be performed to account for differences in the sensors 424, 426, 428, themselves. Calibration may additionally account for defects and differences that result from manufacturing, materials, and different sensor designs.

The calibration algorithm 452 may map moisture and temperature readouts of air and surfaces (as sensed by the different sensors) to a common scale. This common scale may make the sensor outputs effectively comparable to one another. Other calibration processes may address different distances from the ground, as well as any different angles of orientation or 'tilts' of the rear and forward sensors. A tilt or other orientation of each mounted sensor may additionally be calibrated. For example, forward sensors are likely to be tilted in order to effectively scan the road ahead, while rear sensors may not be tilted, or could be tilted in a different direction. An ultrasound sensor positioned in the front of the liquid tank may detected different Doppler velocities than an ultrasound sensor in the rear as a consequence of the sensors' different orientations.

The calibration operations may include scaling processes, such as bias, multiplication, and non-linear functions applied to one or more of the corresponding signals (e.g., signals having the same unit of measurement). The calibration may additionally include an estimating an uncertainty factor 460 based on external knowledge. In one example, processors may mathematically apply an uncertainty score to determine whether a detected difference in sensor measurements is significant or not. For example, when it is raining, calibration may not only account of the fact that the rear sensor in the example layout is going to be slightly less exposed to the falling rain, but that the moisture readings are going to be less precise in general. Another example may occur when the vehicle performs a turning maneuver. During the turn, the length of the road or other surface the front and rear sensors are sensing may not be the same. The uncertainty factor of a detected difference in this case may therefore be proportional to a sideslip between the different tracks of the sensors 424, 426. The uncertainly factor 460 may be used to raise or lower a threshold level of confidence that a leak is actually present. The uncertainty factor may be an estimated variance or covariance of the signal.

Empirical data from testing grounds (e.g., a closed-course track) and actual trip recordings may be used to set the uncertainty factor 460, as well as weighted coefficients for various sensors and conditions so that the outputs match when expected. Illustrative such conditions may include windspeed, different moisture types of different liquids, precipitation, and turn angles, among many other factors. Machine learning may be employed to train models 462, 464 based on the empirical data. For instance, a model 462, 464 may access and identify different images and other sensor measurements and then match the measurements to known conditions and assessments. For example, a detected pattern of streaks formed on the lens of a camera and included in the collected camera image may be determined through modelling to be of a type manifested by a liquid leak, rather than precipitation. In another example, a detected cooler temperature to the rear of the reservoir, combined with a recognized light variation, may be determined to be the result of an environmental condition, rather than a leak.

Figure 5:
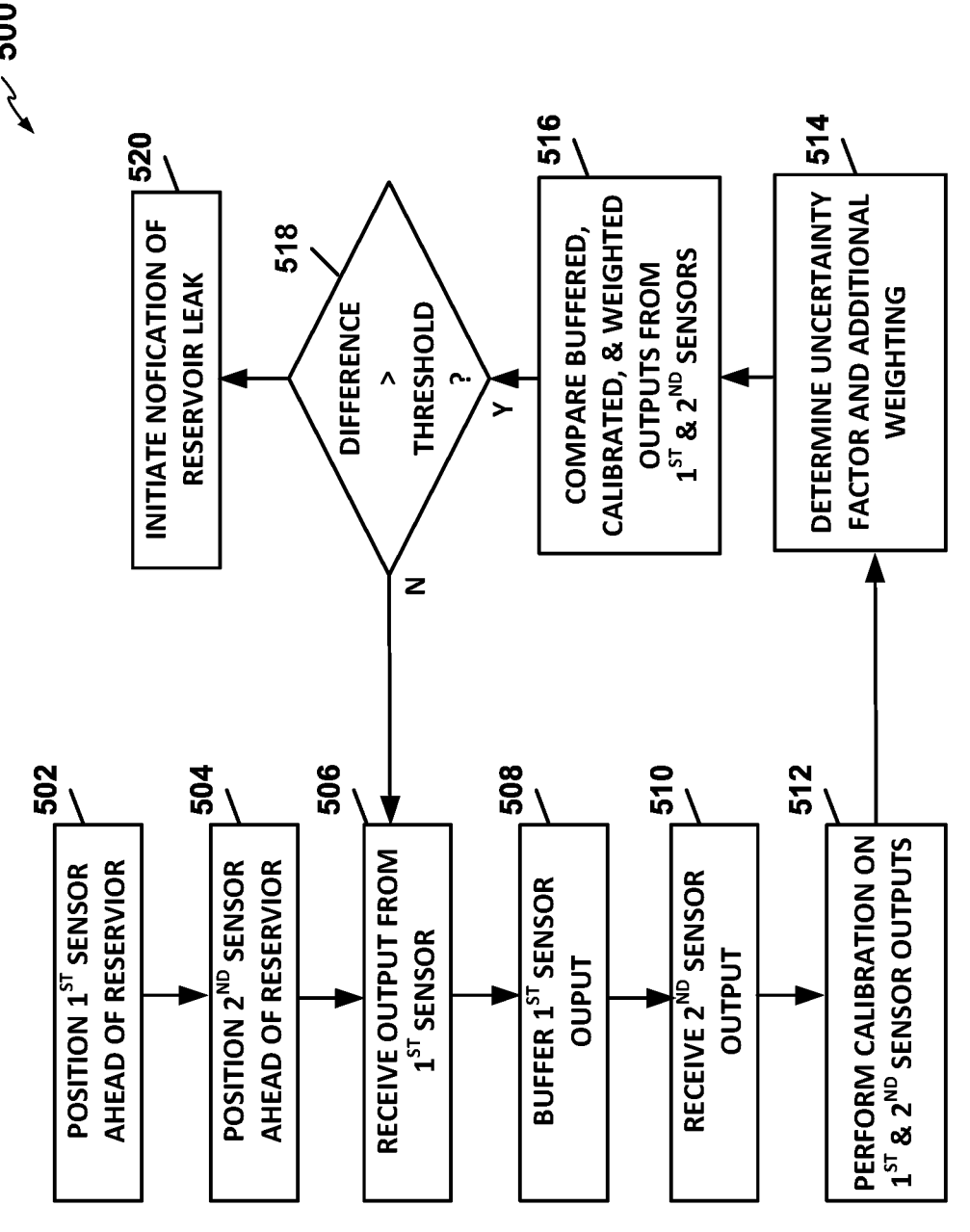
FIG. 5 is a flow diagram of an embodiment of a method of detecting a liquid leak in a reservoir of a moving vehicle by comparing outputs of sensor positioned on either side of a liquid reservoir.

FIG. 5 is a flow diagram of an embodiment of a method 500 of detecting a liquid leak in a reservoir of a moving vehicle by comparing outputs of sensor positioned on either end of a liquid reservoir. While many of the illustrative processes described herein may apply to a semi-truck and trailer, the embodiments of the underlying method 500 may apply to other types of autonomously driven vehicles. Moreover, the processes presented in the flow diagram may be performed in different sequences in different embodiments of the method 500, which may omit or add other processes from that which is shown in the example of FIG. 5. The method 500 may be performed by any of the systems described in FIGS. 1-4.

Turning more particularly to FIG. 5, the method 500 includes positioning at 502 a first sensor in front of a liquid reservoir. For example, the first sensor 114a of FIG. 1 may be positioned on the front of the vehicle 401 and reservoir 422. Positioning may include measurement or computation of position and orientation based calibration values.

At 504, the method 500 may include positioning a second sensor to the rear of the liquid reservoir. For instance, the second sensor 114b of FIG. 1 may be positioned behind the reservoir 422. Positioning may include measurement or computation of position and orientation based calibration values.

During operation of the vehicle at 506, the processors may include a sensor output from the first sensor. For example, the sensors 428 of FIG. 4 may output sensor measurements to the processor 402.

The signal from the first sensor 428 may be buffered at 508. The sensor output may be buffered so that an output from the second sensor 426 (e.g., transmitted at 510) is taken at the same point along the roadway.

At 512, the system may perform calibration processes on the first and second sensor outputs. As explained herein, calibration may account for different placement and orientations of the sensors. Other calibration processes may account for factors such as shade, wind speed, and precipitation that may expose sensors to different conditions.

The method 500 may include determining at 514 an uncertainty and other weighting factors. For instance, the system may access modeled data and perform calculations used to set the uncertainty factor, as well as weighted coefficients for various sensors and conditions so that the outputs match when expected. As described herein, the weighting may be used to perform mathematical scaling to filter out sensor output data that is nondeterminative for detecting a leak in the liquid tank.

The measurements from the sensors may be compared at 516. As described herein, the measurements may have been buffered, calibrated, and weighted to focus and isolate factors for the comparison at 518. For example, the processing may filter out conditions that could result in differences between the measurements, other than leak conditions. The comparison of an embodiment at 518 may including determining if a difference discerned from the comparison exceeds a preset threshold. Where so, the method 500 may initiate at 520 a notification of a likely liquid tank leak.

The client device as described herein may include a user equipment, a mobile device, a tablet, a smartwatch, a laptop, a smart glass, an internet-of-things (IOT) device, or a smart vehicle. The vehicle may be an autonomous vehicle, a semi-autonomous vehicle, or a non-autonomous vehicle.

Some embodiments involve the use of one or more electronic processing or computing devices. As used herein, the terms "processor" and "computer" and related terms, e.g., "processing device," "processing system," and "controller" are not limited to just those integrated circuits referred to in the art as a computer, but broadly refers to a processors, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms such as processor, processing device, and related terms.

In the embodiments described herein, memory may include, but is not limited to, a non-transitory computer-readable medium, such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A vehicle comprising:
a liquid reservoir;
a first sensor mounted in front of the liquid reservoir toward a front of the vehicle;
a second sensor mounted behind the liquid reservoir toward a rear of the vehicle;
a memory storing instructions;
at least one processor configured to access the memory and receive a plurality of inputs from the first and second sensors, the at least one processor being configured to:
compare a first sensor output from the first sensor to a second sensor output from the second sensor; and
based on a determined difference between the first and second sensor outputs, initiate a notification of a detected leak in the liquid reservoir,
wherein the at least one processor is further configured to buffer the first sensor output based at least in part on a distance between the first sensor and the second sensor.

2. The vehicle of claim 1, wherein the buffering is based at least in part on a speed of the vehicle at a time the first and second outputs are received.

3. The vehicle of claim 1, wherein the first and second sensors are selected from a group that includes: a moisture sensor, a camera, a laser, an infrared camera, an ultrasound sensor, a temperature sensor, a radio detection and ranging (RADAR) sensor, and a chemical sensor.

4. The vehicle of claim 1, wherein the first and second sensor outputs include one of: a temperature, a digital image, a moisture reading, a reflective property, a Doppler reading, a chemical concentration.

5. The vehicle of claim 1, wherein the at least one processor is further configured to calibrate the first and second sensor outputs to a common scale.

6. The vehicle of claim 1, wherein the at least one processor is further configured to calibrate the first and second sensor outputs using at least one of: a relative placement of first and second sensor mounts, an orientation of at least one of the first and second sensors, an environmental exposure, an environmental condition, and a trained computational model.

7. The vehicle of claim 1, wherein initiating the notification further includes transmitting the notification to a remote mission control center.

8. The vehicle of claim 1, wherein the at least one processor is further configured to determine an uncertainty factor that is used to analyze to determine a relative significance of the determined difference.

9. The vehicle of claim 8, wherein the uncertainty factor is based on at least one of an environmental condition or a vehicle condition affecting at least one of the first and second sensor outputs.

10. A method of detecting a leak in liquid reservoir of a moving vehicle, the method comprising:
receiving a first sensor output from a first sensor positioned in front of a liquid reservoir toward a front of the vehicle;
receiving a second sensor output from a second sensor positioned behind the liquid reservoir toward a rear of the vehicle;
comparing the first sensor output to the second sensor output; and
based on a determined difference between the first and second sensor outputs, initiating a notification of a detected leak in the liquid reservoir,
wherein the method further comprises buffering the first sensor output based at least in part on a distance between the first sensor and the second sensor.

11. The method of claim 10, further comprising buffering the first sensor output based on a speed of the vehicle.

12. The method of claim 10, further comprising calibrating the first and second sensor outputs to a common computational scale.

13. The method of claim 10, further comprising calibrating the first and second sensor outputs using at least one of: a relative placement of first and second sensor mounts, an orientation of at least one of the first and second sensors, an environmental exposure, an environmental condition, and a trained computational model.

14. The method of claim 10, wherein initiating the notification further includes transmitting the notification to a remote mission control center.

15. The method of claim 10, further comprising determining an uncertainty factor that is used to analyze to determine a relative significance of the determined difference.

16. The method of claim 10, further comprising determining an environmental condition or a vehicle condition affecting at least one of the first and second sensor outputs.

17. At least one computer-readable storage medium with instructions stored thereon that, in response to execution by at least one processor, cause the at least one processor to:
receive a first sensor output from a first sensor positioned in front of a liquid reservoir toward a front of a vehicle;
receive a second sensor output from a second sensor positioned behind the liquid reservoir toward a rear of the vehicle;
compare the first sensor output to the second sensor output; and
based on a determined difference between the first and second sensor outputs, initiate a notification of a detected leak in the liquid reservoir,
wherein at least one computer-readable storage medium further causes the at least one processor to buffer the first sensor output based at least in part on a distance between the first sensor and the second sensor.

18. The computer-readable storage medium of claim 17, wherein the buffering is based at least in part on a speed of the vehicle at a time the first and second outputs are received.

19. The computer-readable storage medium of claim 17, wherein the first and second sensors are selected from a group that includes: a moisture sensor, a camera, a laser, an infrared camera, an ultrasound sensor, a temperature sensor, a radio detection and ranging (RADAR) sensor, and a chemical sensor.

20. The computer-readable storage medium of claim 17, wherein the at least one computer-readable storage medium further causes the at least one processor to calibrate the first and second sensor outputs to a common scale.

*     *     *     *     *